July 17, 1923.

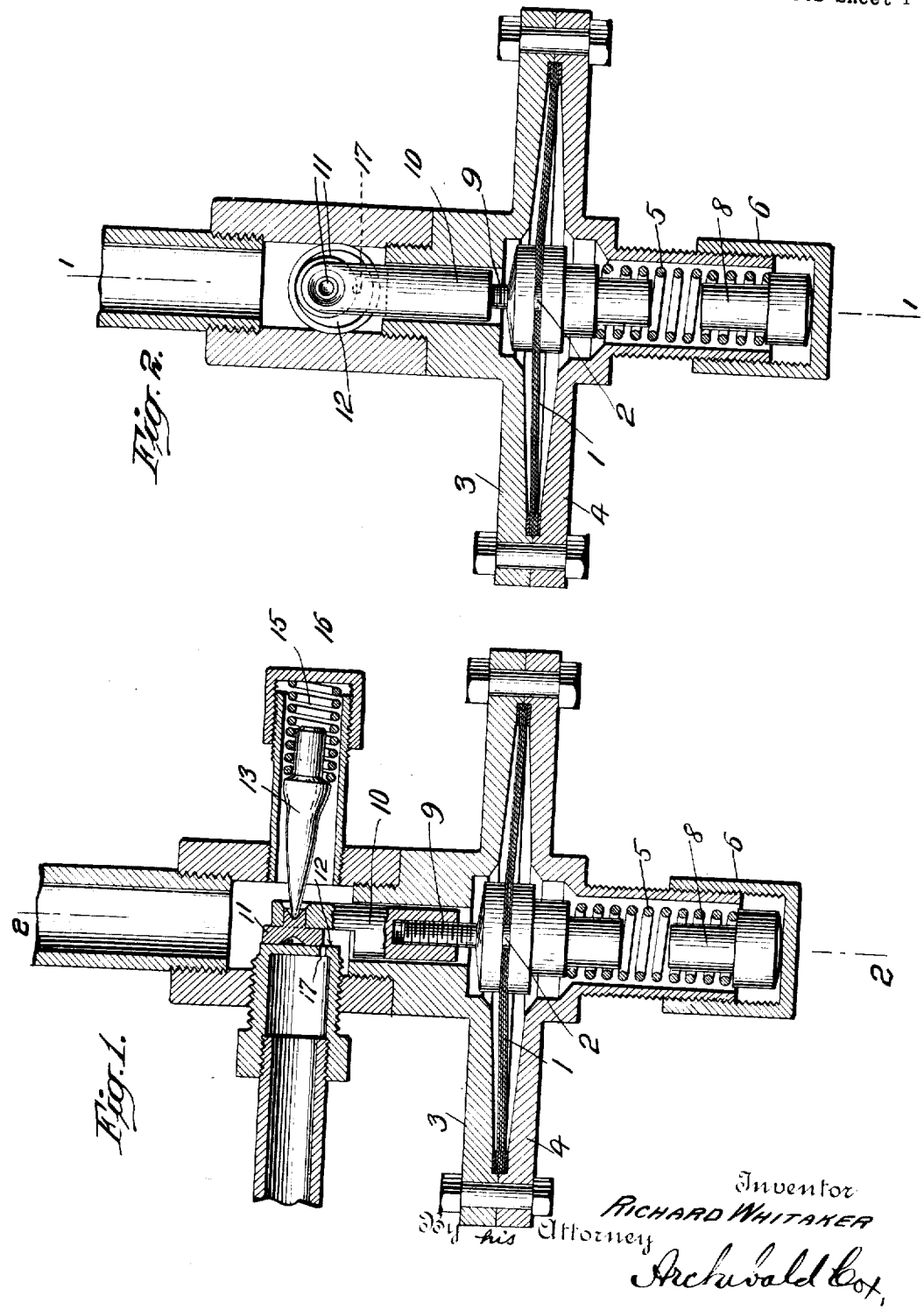

R. WHITAKER

EXPANSION VALVE

Filed June 16, 1920

1,462,466

2 Sheets-Sheet 2

Inventor
RICHARD WHITAKER
By his Attorney
Archibald Cox

Patented July 17, 1923.

1,462,466

UNITED STATES PATENT OFFICE.

RICHARD WHITAKER, OF BRADLEY BEACH, NEW JERSEY, ASSIGNOR, BY MESNE ASSIGNMENTS, TO BRUNSWICK-KROESCHELL COMPANY, OF NEW BRUNSWICK, NEW JERSEY, A CORPORATION OF NEW JERSEY.

EXPANSION VALVE.

Application filed June 16, 1920. Serial No. 389,359.

*To all whom it may concern:*

Be it known that I, RICHARD WHITAKER, a citizen of the United States, residing at Bradley Beach, in the county of Monmouth and State of New Jersey, have invented a new and useful Expansion Valve, of which the following is a specification.

The invention relates to improvements in valves, and has for its general object to provide a valve automatically opening at predetermined pressure to which the mechanism may be adjusted, to secure the maintenance of the selected pressure more accurately and with less trouble and expense than devices heretofore used for the purpose. The invention has been developed as an expansion valve for ammonia refrigerating machines, to provide a valve operating practically instantaneously so as to maintain the predetermined pressure at all times, without its effectiveness being impaired by clogging or wear and without leakage or the employment of packing. It is applicable also to all other situations and uses wherein it is desired to maintain a particular pressure.

Figure 3:
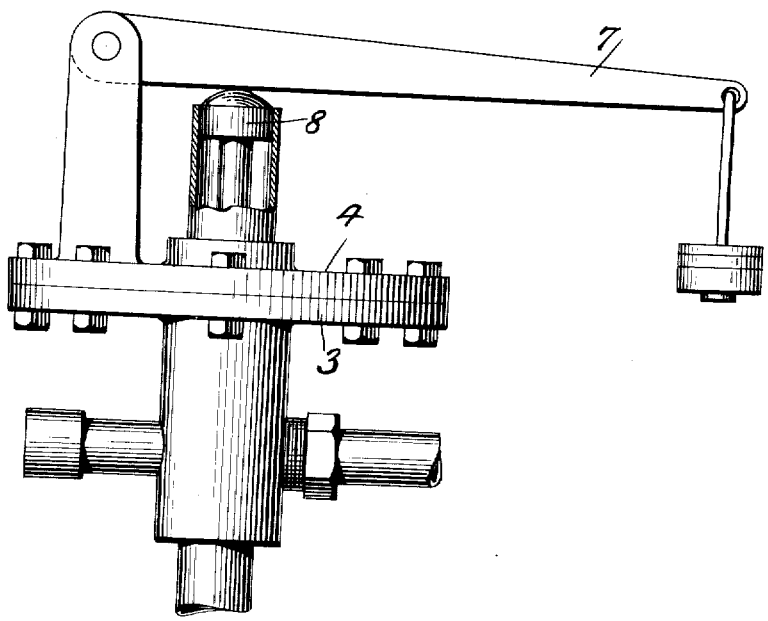
Figure 4:
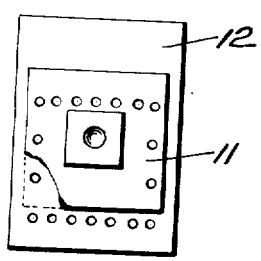
Figure 5:
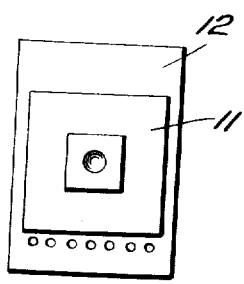

The objects aforesaid are attained by mechanism such as is illustrated in the accompanying drawings, in which Fig. 1 is a section on the line 1—1 of Fig. 2; Fig. 2 is a section on the line 2—2 of Fig. 1; Fig. 3 is an elevation showing a modification consisting of a lever and weights substituted for the spring and cap illustrated in Figs. 1 and 2; Fig. 4 is a detail of one form of the slide valve; and Fig. 5 a modification thereof.

Referring to Figs. 1 and 2, a diaphragm 1, preferably consisting of a plurality of thin tempered steel leaves or plates bolted together at the center by the spindle 2, is held tight at its annular edges, with suitable packing, by the members 3 and 4 bolted together, so as to be gas tight. The spring 5, adjustable by the screw-cap 6 (or, in the modification shown in Fig. 3, the weighted lever 7), bears against the spindle 8, integral with or fastened to the spindle that bolts the diaphragm. The pressure against the side of the diaphragm may thus be adjusted at the desired point.

On the other side of the diaphragm, the spindle holding together the leaves of the diaphragm is provided with a bolt 9, upon which is mounted a nut 10, having an extension which receives a lug or other connection of the slide 11 of the valve. The slide 11 is provided with a smooth, hardened, flat surface contacting with the similar surface of its seat 12 and held seated tightly against it by the spindle 13, co-operating with the spring 15, adjustable by the screw-cap 16. The seat 12 is provided with a port 17. In the modification shown in Fig. 4, the seat 12 and slide 11 are provided with a series of ports that register when the slide is in a certain position on its seat; and in the modification in Fig. 5, the seat is provided with a line of ports. The selection between these depend chiefly upon the nature of the substance handled by the valve.

The operation is as follows:—The spring pressure, or pressure exerted by the lever and weight, on the diaphragm being adjusted at the desired point, in the absence of pressure on the other side of the diaphragm, the slide will be moved, freeing the unobstructed passage through the port or ports. In Figs. 1 and 2, the diaphragm is shown in this position somewhat exaggeratedly, since in the case of an ammonia machine a movement of something like one-sixteenth of an inch is sufficient to open or close the port. The port being open, the ammonia coming through the port increases the pressure on the diaphragm until it reaches the pressure exerted on the other side and moves the diaphragm against that pressure, which in turn moves the slide of the valve on its seat, closing the port.

The comparatively high pressure against the seat and at the port or ports against the bottom of the slide, which is kept down on its seat by the spring, results in very rapid passage of the gas through the clear port or ports when opened by the movement of the slide, the ports being cleared and kept clear by the action of the valve. The hardened contacting surfaces of the slide and its seat are not impaired by wear, which serves only to maintain the gas-tight contact between them. No packed joint is involved; and the parts are easily assembled and easily accessible.

I claim:—

1. A valve comprising a seat provided with a port, a slide movable to close and open the port, said slide having a depression in its upper surface, a spindle, one end of which is received in the depression, a spring for pressing the spindle against the slide to keep the latter in operable contact with the seat, a diaphragm arranged to be moved by pressure thereagainst, and a connection between the diaphragm and the slide, whereby the movement of the diaphragm is imparted to the slide to close and open the port.

2. A valve comprising a seat provided with a port, a slide movable to close and open the port, a spindle in engagement with the upper surface of the slide, means for pressing the spindle against the slide to keep the slide in operable contact with the seat, a diaphragm arranged to be movable by pressure thereagainst, and connections between the diaphragm and the slide, whereby the movement of the diaphragm is imparted to the slide to close and open the port.

3. A valve comprising a seat provided with a port, a slide upon the seat movable to close and open the port, means engaging the upper side of the slide at a single point and adapted to move with the slide for holding the slide against its seat, and a diaphragm connected with the slide to impart its movement thereto.

4. A valve comprising a casing enclosing a chamber, a diaphragm constituting one wall of the chamber, a seat in the chamber provided with a port, a slide mounted on the seat and movable to close and open the port, spring-pressed means engaging the slide and movable therewith to hold it in operable contact with the seat, and connections between the diaphragm and the slide whereby the movements of the diaphragm are imparted to the slide.

5. A valve comprising a casing enclosing a chamber, a diaphragm constituting one wall of the chamber, an inlet and outlet passage through the chamber, a seat with a port interposed in the passage, a slide on the seat movable to close and open the port, a spring-pressed spindle in engagement with the slide to hold it in operable contact with the seat, and connections between the diaphragm and the slide to impart the movements of the diaphragm to the slide.

RICHARD WHITAKER.